United States Patent [19]

Lim et al.

[11] Patent Number: 4,569,858
[45] Date of Patent: Feb. 11, 1986

[54] SURFACE MODIFICATION OF HYDROPHILIC CONTACT LENSES

[75] Inventors: Drahoslav Lim; Peter C. Morris, both of San Diego, Calif.

[73] Assignee: Barnes-Hind, Inc., Sunnyvale, Calif.

[21] Appl. No.: 695,771

[22] Filed: Jan. 28, 1985

[51] Int. Cl.$^4$ .............................. G02C 7/04; B05D 5/06
[52] U.S. Cl. ................................... 427/164; 351/160 H
[58] Field of Search ..................... 427/164; 351/160 H

[56] References Cited

U.S. PATENT DOCUMENTS 4,411,932 10/1983 Kwan .................................. 427/164
4,442,141 4/1984 Lim ...................................... 427/164

*Primary Examiner*—James R. Hoffman

[57] ABSTRACT

The present invention relates to a method of modifying a surface of a soft contact lens to make the lens resistant to soiling. The method comprises initiating a reaction between the unhydrated lens surface containing carboxylic acid or alcohol moieties and agents capable of reacting with carboxylic acid or alcohol moieties in order to produce a surface which then either has a hydrophobic coating, a nonionic hydrophilic coating or is charged.

8 Claims, No Drawings

SURFACE MODIFICATION OF HYDROPHILIC CONTACT LENSES

BACKGROUND OF THE INVENTION

1. Field of the Invention

This invention relates to hydrophilic plastic materials useful as soft contact lenses, and more particularly relates to treatment of said hydrophilic soft contact lenses to make them more resistant to soiling in use.

2. The Prior Art

It has long been known to fabricate contact lenses from rigid materials such as glass and clear polymers, e.g., essentially hydrophobic acrylic-type polymers as polymethylmethacrylate and the like. Although more safely handled and used than glass, such hydrophobic polymer materials have been only moderately successful as contact lenses, being too hard and uncomfortable to the wearer. More recently, contact lens compositions have been developed from hydrophilic-type polymers which are softer and generally more easily accommodated by the eye. Thus, the use of hydrophilic polymer lens compositions is becoming of increasing importance in ophthalmological practice.

Hydrophilic polymers useful as soft contact lenses typically are lightly cross-linked copolymers derived from one or more hydroxyl-group containing monomers. In their hydrated state, these polymers are known generally in the art as "hydrogels". Hydrogels are specifically defined as coherent, three-dimensional polymer structures or networks which have the ability to absorb or imbibe large quantities of water without dissolution. At the present time, the specific class of polymer hydrogels which have gained particular commercial acceptance as soft contact lenses are those derived from acrylic esters. U.S. Pat. Nos. 2,976,576 and 3,220,960, issued to O. Wichterle and D. Lim on Mar. 28, 1961 and on Nov. 30, 1965, respectively, are early patents which describe the use of acrylic ester hydrogels for the manufacture of soft contact lenses. Many subsequent patents as well as other technical articles are directed to the preparation of numerous other acrylic ester-type hydrogels which differ primarily in the type and/or percentage of comonomers contained therein.

In the main, acrylic ester hydrogels are all derived by copolymerizing a major amount of a water-soluble monoester of acrylic or methacrylic acid in which the ester moiety contains at least one hydrophilic group and a minor amount of a bifunctional diester of acrylic or methacrylic acid which cross links the hydrophilic group-containing monomer as it polymerizes.

Although presently used contact lenses fabricated from polymer hydrogels are much softer than the prior hard contact lenses and can be accommodated by the wearer with relatively little discomfort, they nevertheless have disadvantageous properties and likewise have not been completely satisfactory.

A major problem with hydrophilic soft contact lenses is the deposition of various soils contained in the tears on the surface of the lens. This invention relates to methods of treating the surfaces of hydrophilic contact lenses while they are in their dehydrated or dry state. The treatment described reduced the amount of soiling of the lenses by varying degrees, in particular, the rate of lysozyme deposition on the hydrated lenses is reduced significantly. A description of the problem with the soiling of hydrophilic or soft contact lenses is contained in an article titled "Analysis of Deposits on High Water Content Contact Lenses" from the J. of Biomedicals Materials Research, Vol. 17, pp. 261 through 274, 1983.

It is an object of this invention, therefore, to provide a soft contact lens which is resistant to soiling by deposits contained in tears of the human eye.

This and other objects of this invention will become apparent to those skilled in the art from the description of the invention which follows.

SUMMARY OF THE INVENTION

The present invention comprises treating an unhydrated polymer material having reactive groups on its surface to be used as a soft contact lens with a compound which will modify the surface of the material and make it more resistant to soiling.

DESCRIPTION OF THE PREFERRED EMBODIMENTS

This invention relates to the chemical modification of the surface of the unhydrated hydrophilic contact lenses containing reactive groups, for example, hydroxyl and/or acid groups.

The preparation of hydrophilic contact lenses are well known in the art. For example, the preparation of acrylic ester hydrophilic polymers are prepared by copolymerizing hydroxyethylmethacrylate and ethylene glycol dimethacrylate has long been known, being described in the aforementioned U.S. Pat. Nos. 2,976,576 and 3,220,960. The later patents directed to various modifications of the foregoing basic copolymers include among others, copolymers of the hydroxyalkyl methacrylates with vinyl pyrrolidone as described, for example, in a series of U.S. patents beginning with U.S. Pat. No. 3,503,393 to Seiderman. It is to be understood, however, that while many hydrophilic polymers adapted for the preparation of soft contact lenses contain suitable functional groups and thus may be successfully treated in accordance with this invention, neither said hydrophilic polymers per se nor their preparation and/or fabrication into lenses constitute a part of this invention.

The surface of the unhydrated hydrophilic contact lenses is chemically modified by utilizing the reactive hydroxy and/or acid groups on the surface of the lenses. The surface then either has a hydrophobic coating, nonionic hydrophilic coating or becomes charged depending on the agent used to modify the surface.

The surface modification can be performed via two methods. The first method involves the pretreatment of the surface of the dry lens with a strong base in a non-swelling solvent to produce anionic groups and then iniating a second reaction involving the group to be attached to the surface.

The second method involves the direct reaction of the hydroxy and/or acid groups with reagent.

In the first method, the strong base useful includes potassium t-butoxide, sodium methoxide and butyl lithium. However, any very dilute solution of a strong organic base capable of converting alcohols to alkoxides may be utilized.

The non-swelling solvent is important because the reaction must take place at the surface of the lens so that the fundamental properties of the polymer will not be changed. If there is penetration into the lens matrix, then an alteration can be expected of the physical properties of the material, e.g., water content and swelling factors. Suitable non-swelling solvents include ethers and hydrocarbons.

After the pretreatment of the surface material with a strong base in a non-swelling solvent, the surface is reacted with a alkylating, acylating or sulfonating agent capable of reacting with alkoxides or carboxylates.

Suitable agents include neodecanoyl chloride, butane sultone, propane sultone, and pivaloyl chloride.

The second method of treatment involves the direct reaction of the groups in the lens polymer with reagent.

Reagents utilizable are those capable of reacting with carboxylic acid or alcohols and include diazoalkanes, e.g. diazomethane, dimethylformamide dialkyl acetals, e.g., dimethylformamide dimethyl acetal and the reaction product of alkylenediisocynate and polyethylene glycol monomethyl ether.

Depending on the method and agent used, the time for the reaction is 1 to 24 hours and temperature is ambient to 100° C.

EXAMPLE 1

This example illustrates the procedure by which anionic carboxylic acid groups, derived from the incorporation of methacrylic acid into contact lens formulations, are converted to neutral alkyl esters.

A Hydrocurve II 55 contact lens, which has not been previously hydrated, was immersed in a 0.1 M solution of diazomethane in 1,1,2-trichlorotrifluoroethane for 30 minutes at 20° C. The modified lens was then placed into a 1 percent acetic acid solution for one hour at 20° C. to neutralize residual diozamethane. Subsequently, the lens was hydrated in pH 7.4 phosphate buffer at 80° C. for six hours and then equilibrated into physiological saline.

The action of diazomethane was limited to the surface of the lens as indicated by the retention of high water content shown in Table I.

The treatment is selective to carboxylic acid esterication. Additional reactions would be observed as a loss of wettability. The contact angle of a modified surface was not increased. Similarly other physical properties of the modified lens such as oxygen transmissibility and mechanical strength are unchanged.

As desired, the lens character was altered with respect to the surface's affinity for protein. Table I shows the substantial reduction in adsorbed protein observed after subjection to an artificial tear solution.

EXAMPLE 2

Modification of the surface cross-link density of a hydrogel was affected by treatment with difunctionally reactive reagents. In particular, the pore size of an Hydrocurve-II 55 was reduced by treatment with hexamethylene di-isocyanate for one hour at 70° C. During modification the lens was not swollen by HMDI whereby the reaction was limited to the surface of the lens. Following the treatment, the lens was rinsed with petroleum ether and then hydrated as described in Example 1. A reduction in adsorption of lysozyme was observed.

EXAMPLE 3

The introduction of a hydrophobic coating onto the surface of a soft contact lens was achieved and is described in this example. A hydrophilic contact lens of the same type used in Example 1 was treated with 1% potassium tert-butoxide in ether for 30 minutes at 20° C., then immediately reacted with neo-decanoyl chloride for one hour at 70° C. The lens was rinsed finally with ethyl ether and then hydrated as per Example 1. The material modified in the present example showed a considerable decrease in lysozyme adsorption. Wettability of the surface of the material was reduced as expected from the hydrophobic derivitization of the surface.

EXAMPLE 4

This example describes the application of a nonionic hydrophilic coating to a soft lens surface. A lens of the type used in Example 1 was treated with the adduct of polyethylene glycol monomethyl ether 5,000 and hexamethylene diisocyanate. The lens was immersed in a melt of the purified adduct at 70° C. for one hour. The lens was removed and hydrated as per Example 1. The resultant lens appeared normal in all respects, except an increase in wettability. The presence of a polyethyleneglycol coating was observed by FTIR/ATR.

EXAMPLE 5

The incorporation of anionic sulfonic acid groups into the surface of a contact lens was accomplished in a two-step reaction. A lens of type used in Example 1 was treated with 1% potassium tert-butoxide in ether for 30 minutes at 20° C. and then reacted with 1,4 butane sultone at 70° C. for one hour. The lens was then rinsed with ethyl ether and hydrated as per Example 1. An increase in wettability was observed; other characteristics were unchanged.

EXAMPLE 6

This example describes the assay used for an eight day in vitro test of protein deposited onto a soft contact lens. Hydrocurve HC-II 55 lenses, surface treated as per Example 1, and stock lenses were incubated at 35° C. in a pH 7.4 buffered isotonic saline solution containing physiological concentrations of the three major human tear proteins: lysozyme 2.15 mg/ml, albumin 3.94 mg/ml and lactoferrin 1.45 mg/ml. The test lenses were rinsed with buffered saline and then the ultraviolet absorbance of the lenses were measured spectrophotometrically. The assay was repeated every 24 hours and incubation resumed with fresh artificial tear solutions. Protein deposition was calculated using an extinction coefficient of 2.38 cm$^3$/mg at 280 nm. The results are listed in Table I.

TABLE I

| Time in Days | Total Adsorbed Protein of Unmodified Lens in in ug/cm$^2$ | Total Adsorbed Protein of Example 1 Modified Lens in ug/cm$^2$ |
| --- | --- | --- |
| 1 | 99.1 | 2.2 |
| 2 | 177.8 | 7.1 |
| 3 | 265.4 | 4.7 |
| 4 | 326.6 | 4.7 |
| 7 | 359.5 | 7.9 |
| 8 | 406.0 | 6.6 |

What is claimed is:

1. A method of modifying a surface of a soft contact lens which makes it resistant to soiling, said method comprising initiating a reaction between an unhydrated lens surface containing carboxylic acid of alcohol moieties and an agent capable of reacting with carboxylic acid or alcohol moieties wherein said agent is a diazoalkane, dimethyl formamide dialkyl acetal, alkylenediisocyanate or the reaction product of alkylenediisocyanate and polyethylene glycol monomethyl ether.

2. The method of claim 1 wherein the agent is diazomethane, dimethylformamide dimethyl acetal, hexamethylene diisocyanate, or the reaction product of polyethylene glycol monomethyl ether and hexamethylene diisocyanate.

3. A contact lens made resistant to soiling by the method of claim 1.

4. A method of modifying a surface of a soft contact lens which makes it resistant to soiling, said method comprising (a) treatment of the surface of an unhydrated lens with a strong base in a non-swelling solvent to produce anionic groups on the surface; and (b) initiating a reaction with an alkylating, acylating or sulfonating agent.

5. The method of claim 4 wherein the strong base is potassium t-butoxide, sodium methoxide or butyl lithium.

6. The method of claim 4 wherein the reaction agent is neodecanoyl chloride, butane sultone, propane sultone or pivaloyl chloride.

7. The method of claim 4 wherein the time of the reaction is 1 to 245 hours and the temperature is ambient to 100° C.

8. A contact lens made resistant to soiling by the method of claim 4.

* * * * *